Patented July 1, 1941

2,247,722

UNITED STATES PATENT OFFICE 2,247,722

PROCESS FOR THE EMULSIFICATION OF TARS

William James Chadder, Henry Michael Spiers, and Edwin Arnold, London, England, assignors to Thermal Industrial and Chemical (T. I. C.) Research Company Limited, London, a British company No Drawing. Application July 1, 1936, Serial No. 88,494. In Great Britain August 10, 1935

14 Claims. (Cl. 134—1)

The present invention relates to an improved process for the production of stable emulsions of coal tar, pitch, bitumen and the like, in water, which emulsions are particularly suitable for use on roads.

A principal object of the invention is to provide a process for the emulsification of tars and the like by means of which emulsification can be effected by simple stirring or mixing, and which consequently has the important practical and commercial advantages that the apparatus employed for carrying out the process is relatively simple and inexpensive.

The British standard specification for road tar emulsions requires that the percentage of emulsifying agent in the emulsion shall not exceed 2% by weight (reckoned on a dry basis) and the present process leads to the production of emulsions which comply with this requirement. We find that in certain cases the application of the present process enables emulsions to be prepared using much less than this quantity of emulsifying agent, depending on the nature of the tar and of the emulsifying agent, and on the degree of stability required in the final emulsion.

Before proceeding to the particular description of the present invention, it is necessary to define certain of the terms hereinafter used. In the present specification and claims, by the term "invert" or "inverted emulsion" we mean an emulsion of the "water-in-oil" type, in which the tar, bitumen or the like forms the continuous phase, and the water forms the disperse phase, which is the type of emulsion produced in the first stage of the present process; the vessel in which this emulsion is produced is called the "invert tank."

By "revert" or "reverted emulsion" we mean an emulsion of the "oil-in-water" type, in which the water forms the continuous phase, and the tar, bitumen or the like forms the disperse phase, and which is the type of emulsion which it is desired finally to obtain; the vessel in which this emulsion is produced is called the "revert tank."

In its broadest aspect, the present invention comprises a two-stage process for the preparation of stable aqueous emulsions of bituminous material such as road tars, pitch and bitumen suitable for use on roads, the first stage of the process consisting in the preparation of an inverted emulsion of the "water-in-oil" type from the bituminous material to be emulsified, and a quantity of water amounting to about 12 to 16% by weight of the quantity of bituminous material, together with a water-soluble emulsifying agent, and in the second stage of the process this inverted emulsion is added to and dispersed in an aqueous alkaline solution containing about 15% to 25% by weight of water-soluble emulsifying agent or agents (reckoned on a dry basis), whereby the inverted emulsion is reverted into an emulsion of the desired "water-in-oil" type. By the term "solution" employed in the present specification and claims is meant an aqueous solution, colloidal solution or gel.

Other features of the invention will be apparent from the following description and from the appended claims.

The invention, and the method of performing the same in practice will be described with reference to various specific examples.

Apparatus suitable for carrying out the process consists essentially of two tanks of suitable capacity, so arranged that the contents of the first tank (the invert tank) can be allowed to flow into the second tank (the revert tank), together with means for drawing off the finished emulsion from the second tank. Each of the tanks is fitted with power-driven stirring apparatus, of such a character as to give effective mixing of the contents of the tanks, but rotating at a comparatively low speed. The invert tank is provided with steam heating to keep the contents fluid, and the revert tank may also be provided with steam heating in order to facilitate the preparation of the emulsifying agents used therein. Apparatus of this type was employed in each of the examples given hereinafter, the stirrers rotating at about 30 revolutions per minute.

The preparation of certain dispersing or emulsifying agents employed in the process will first be described.

(a) Sodium Soap of Liquid Rosin

The soap is prepared from commercial liquid rosin by the addition thereto of caustic soda (e. g., as a solution of 20% strength) amounting to 10% of NaOH by weight of the liquid rosin. The amount of water is adjusted so that the mixture contains 50% of soap by weight. If this soap is diluted to 2% strength with distilled water, the pH value of the solution should be within the range 8½–9½, phenolphthalein being used as an indicator. In practice, it is often found useful to dilute this soap and the soaps hereafter described with water to e. g., 25% strength to facilitate pumping.

(b) Casein/Sodium Rosin Soap Mixture

Depending on the weight of casein to be added per pound of 50% sodium rosin soap, addition of further alkali may be necessary in order to effect solution of the casein. This extra alkali may either be added to the soap to form a stock material, or may be added with the casein. For example, the soap of a above, having a pH value of 8½ to 9½ when tested in the manner described, will take up about 15 lbs. of casein per 100 lbs. of 50% soap. Such a ratio of casein/sodium rosin soap is suitable for the emulsification of some tars, (see Example 4), but we prefer to use a ratio approaching 1 lb. of casein to 1 lb. of 50% sodium rosin soap, since such a mixture is of general application in the process, and to attain these proportions in the mixture, additional alkali must be added, as indicated above.

A suitable mixture is prepared by mixing equal weights of powdered soluble casein (e. g., that sold commercially as "Laitzo" Brand casein) and 50% sodium rosin soap from a above, together with such additional amount of alkali solution as may be required to effect the solution of the casein. Suitable alkalis are caustic soda, tri-basic sodium phosphate, ammonium hydroxide, caustic potash or borax. Suitable amounts of alkali are indicated in a subsequent example. The casein/sodium rosin soap mixture is diluted with hot water to a strength of from 15 to 25% reckoned on a dry basis.

When additional alkali is used for effecting solution of the casein, it is necessary to avoid too great an excess if a strong alkali such as caustic soda be used, and the pH value of the resulting mixture, when measured as described above in diluted form, should be within the range 8½ to 9½. When the additional alkali is a weak one, such as ammonia, more latitude as regards its amount is possible since excess amounts (in reason) do not have a large effect on the pH value of the mixture. These considerations apply to the subsequent examples in which ammonia is mentioned.

(c) Ammonium Soap of Liquid Rosin

The soap is prepared by stirring 60 lbs. of liquid rosin with 60 lbs. of water and 8.8 lbs. of ammonia (sp. gr. .880), followed by 110 lbs. of water, the mixture so obtained containing approximately 25% by weight of ammonium rosin soap.

(d) Casein/Ammonium Rosin Soap Mixture 40 lbs. of 25% ammonium rosin soap from c above, 20 lbs. of powdered soluble casein (as specified in b above) and 60 lbs. of hot water (e. g., at about 85° C.) are mixed together, and 1.9 lbs. of ammonia (sp. gr. .880) are added.

(e) Soaps of Oleic Acid

Other soaps or emulsifying agents which can be used in place of the above agents in the present invention are prepared by substituting oleic acid for the liquid rosin, with suitable modifications in the amounts of alkali. Casein is thereafter incorporated as before.

(f) Sodium Alginate

This is used in the commonly marketed form, i. e., in 10% concentration (for example, that sold commercially as "Lissom" brand), or may be obtained by the treatment of alginic acid with caustic soda.

(g) Casein/Sodium Alginate Mixture 25 lbs. of 10% sodium alginate, 25 lbs. of soluble casein (both as referred to above) and 100 lbs. of hot water (e. g., at 85° C.) are mixed together and 1.9 lbs. of ammonia (sp. gr. .880) are added.

(h)

Other soaps which may be employed in the present invention in place of the above include Turkey red oil, and tri-ethanolamine oleate and stearate. Casein is dissolved therein with the aid of suitable quantities of additional alkali and water as before.

When the casein mixtures described above have been properly prepared, they will assume a "gel" condition on standing and/or cooling. This gel condition is a useful, though not indispensable, feature in the preparation of emulsions by means of the present invention.

In any of the above examples, the preparation of the casein/soap mixtures may be effected in the appropriate tank (invert or revert) prior to the addition of the tar or the like.

Example 1

The method of emulsification described in this example has been applied to bitumen and to a variety of different tars, e. g., to horizontal retort tar, continuous vertical retort tar, intermittent vertical chamber tar, metallurgical coke-oven tar, and to mixtures thereof. The grades of tar emulsified have ranged from thin road tar (having a viscosity of 10 seconds as measured at 30° C. in the British Road Tar Association viscometer) to briquetting pitch. In most cases, batches containing 1500 lbs. of tar have been treated, and the figures in the various examples are based on this quantity of tar.

Preparation of the invert

The stirring gear in both tanks is set in rotation, and to the invert tank are added successively 40 lbs. of 25% ammonium rosin soap (prepared as described in c above) and 150 lbs. of hot water (at a temperature of about 85° C.) and these ingredients are mixed. 1500 lbs. of the chosen tar, at a sufficient temperature to render it fluid (e. g., between 50° and 100° C.) are then added to the tank, during a period of about 3 minutes. Formation of the invert is completed substantially by the time that the last of the tar has been added, though the stirring gear may be kept in action during the subsequent discharge of the invert.

Formation of the revert

The next operation takes place in the revert tank, the stirring gear of which is now assumed to be in action. To the revert tank are added successively 40 lbs. of 25% ammonium rosin soap, 20 lbs. of powdered soluble casein, 60 lbs. of hot water at about 85° C., and 1.9 lbs. of ammonia (sp. gr. .880). A casein/ammonium rosin soap mixture as described in d above is thereby formed.

The contents of the invert tank are now continuously added to the mixture in the revert tank, the rate of addition being relatively rapid in the case of an invert made from a tar of low viscosity, and less rapid in the case of inverts made from more viscous tars, the time of addition varying approximately from 45 minutes to 3½ hours at the rate of stirring employed.

When reversion of the inverted emulsion into one of the desired type is proceeding normally, a blackish shining trail of the invert can be seen spreading from the inlet for the invert (which is above the highest level of the liquid in the revert tank) round the tank over the surface of the revert, but the trail disappears substantially before a complete circuit of the tank has been made. Moreover, in the early stages of addition of the invert, the mixture in the revert tank is found to become more viscous.

When all the invert has been added, and the reversion to a "tar-in-water" emulsion of the required type is completed, 190 lbs. of cold or lukewarm water are added with continued stirring to obtain a product containing 75% by weight of tar. The emulsion can be transferred to a storage tank, where it is allowed to cool, and is then barrelled.

To summarize, the numerical proportions set forth above by weight may be stated on a percentage basis as follows:

First stage

Total weight of water=180 lbs.
Total weight of tar=1500 lbs.
Percentage by weight of water with respect to weight of tar=12%

Second stage

Total weight of solution of emulsifying agents= 121.9 lbs.
Total weight of dry emulsifying agents=30.7 lbs.
Percentage by weight of emulsifying agents in solution=25.2%

When it is desired to reduce the percentage of tar in the above emulsion (e. g., to 65%), a solution of potassium bichromate in water is added whereby the emulsion can be diluted with a further quantity of water. For example, a solution of 1 lb. of potassium bichromate in 10 lbs. of water is added to the casein/ammonium rosin soap prior to the addition of the invert thereto. In this case, 485 lbs. of water is required for dilution, instead of the 190 lbs. specified above, in order to produce an emulsion containing 65% by weight of tar.

To summarize, the numeral proportions set forth above by weight in the preceding paragraph, may be stated on a percentage basis as follows:

First stage

Total weight of water=180 lbs.
Total weight of tar=1500 lbs.
Percentage by weight of water with respect to weight of tar=12%

Second stage

Total weight of solution of emulsifying agents= 132.9 lbs.
Total weight of dry emulsifying agents=31.7 lbs.
Percentage by weight of emulsifying agents in solution=23.8%

EXAMPLE 2

A wide range of tars has been emulsified on a laboratory scale by the use of the method of this example, which is described with particular reference to a specific type of tar which, among others, was treated on a large scale.

Preparation of the invert

The stirring gear in both the invert and revert tanks was set in action, and to the invert tank were added 40 lbs. of 25% sodium rosin soap prepared as described in *a* above and having a pH of approximately 9,140 lbs. of hot water (at about 85° C.) and 1.25 lbs. of tri-sodium phosphate (crystals containing 12 molecules of water) dissolved in 10 lbs. of water, followed by 1500 lbs. of tar, the tar in this case being a continuous vertical retort road tar having a viscosity of 900 seconds at 30° C. as measured in a British Road Tar Association viscometer. These ingredients formed the invert.

Formation of the revert

To the revert tank were added 40 lbs. of 25% sodium rosin soap prepared as described in *a* above, 20 lbs. of soluble casein, 130 lbs. of hot water at about 85° C., ⅛ gal. of 5× normal caustic soda solution (⅛ gal. of 5× normal caustic soda solution at a specific gravity of 1.9 weighs approximately 1.5 lbs.) and 1 lb. of tri-sodium phosphate (crystals containing 12 molecules of water) dissolved in 10 lbs. of water. These ingredients formed the casein/sodium rosin soap mixture.

Reversion of the inverted emulsion proceeded as described in Example 1. The tar-in-water emulsion so obtained was diluted with 415 lbs. of cold or lukewarm water to produce a stable aqueous tar emulsion containing 65% by weight of tar.

To summarize, the numeral proportions set forth above by weight, may be stated on a percentage basis as follows:

First stage

Total weight of water=180.7 lbs.
Total weight of tar=1500 lbs.
Percentage by weight of water with respect to weight of tar=12%

Second stage

Total weight of solution of emulsifying agents= 202.5 lbs.
Total weight of dry emulsifying agents=30.7 lbs.
Percentage by weight of emulsifying agents in solution=15.1%

EXAMPLE 3

A wide range of tars has also been emulsified on a laboratory scale by the method of the present example. The application of the method on a large scale will be described with reference to two specific types of tar, namely, continuous vertical retort road tars having viscosities of 220 seconds and 3000 seconds respectively, (measured as previously indicated).

Preparation of the invert

To the invert tank were added 20 lbs. of commercial quality sodium alginate (10% strength), 170 lbs. of hot water (at about 85° C.) and 1500 lbs. of tar. These ingredients formed the invert.

Formation of the revert

To the revert tank were added 25 lbs. of commercial quality sodium alginate (10% strength), 25 lbs. of soluble casein, 100 lbs. of hot water (at about 85° C.) and 1.9 lbs. of ammonia (sp. gr. .880), to form a casein/sodium alginate mixture as described in *g* above. The reversion proceeded in the normal manner, except that in the case of the 3000 seconds tar the mixture had increased considerably in viscosity when rather more than half of the invert had been added. In the case of this tar, therefore, the addition of the invert was then stopped and about 40 lbs. of lukewarm water were added for dilution. The admission of the invert was then continued.

For dilution of the tar-in-water emulsion so obtained, 465 lbs. of water (or 425 lbs. of water in the case of the 3000 seconds tar) were added to produce an emulsion containing 65% by weight of tar. It was possible to dilute these emulsions with a further 190 lbs. of water, to form stable emulsions containing 60% by weight of tar.

To summarize, the numerical proportions set forth above by weight may be stated on a percentage basis as follows:

*First stage*

Total weight of water=188 lbs.
Total weight of tar=1500 lbs.
Percentage by weight of water with respect to weight of tar=12.5%

*Second stage*

Total weight of solution of emulsifying agents=151.9 lbs.
Total weight of dry emulsifying agents=28.2 lbs.
Percentage by weight of emulsifying agents in solution=18.5%

The above examples represent the preferred methods of making emulsions according to the present invention, but we have also found that the inverted emulsion can be made in a variety of different ways, and can be reverted by the use of an appropriate reverting agent as described above.

As examples of inverting agents which have given successful results on various kinds of tars may be mentioned the following, the quantities being expressed in terms of 1500 lbs. of tar, the inverting solution consisting in all cases of 3½ lbs. (or other stated quantity) of the reagent, dissolved in 170 lbs. of water.

(i) Sodium acetate, formate, borate, stearate, or tri-basic phosphate;
(ii) Potassium chromate, bichromate or oleate;
(iii) Tri-ethanolamine oleate or stearate;
(iv) Turkey red oil;
(v) Glue, size or starch, in quantities ranging from 1 to 10 lbs. in various circumstances;
(vi) .35 lbs. of caustic soda.

Finally, an example may be given of one embodiment of the process, in which similar materials were used for the preparation of both the invert and the revert.

EXAMPLE 4

*Preparation of the invert*

1500 lbs. of road tar, 88 lbs. of a casein/sodium rosin soap mixture (containing 3½% casein and 11½% soap, on a dry basis) and 175 lbs. of hot water are added to the invert tank, and the mixture is stirred to form the inverted emulsion.

*Formation of the revert*

220 lbs. of casein/sodium rosin soap mixture as used for the preparation of the invert are placed in the revert tank, and the invert is gradually run in while stirring. 325 lbs. of water are stirred in for dilution, giving a final tar-in-water emulsion containing 65% by weight of tar.

All the above examples fall within the limits indicated in the introduction to the specification and in the appended claims—i. e., the quantity of water incorporated in the inverted emulsion in the first stage of the process is about 12 to 16% by weight (in general it is of the order of 12%) of the amount of tar or the like, while the body of aqueous emulsifying agent into which the inverted emulsion is dispersed in the second stage of the process contains about 15 to 25% by weight of emulsifying agent, either in the form of a simple or of a colloidal solution. It will also be noted that in the above examples the inverted emulsion formed in the first stage is at least sufficiently stable to preserve its condition during the period of its gradual transfer to the vessel in which the second stage of the process is carried out.

To summarize, the numeral proportions set forth above by weight, may be stated on a percentage basis as follows:

*First stage*

Total weight of water=249.8 lbs.
Total weight of tar=1500 lbs.
Percentage by weight of water with respect to weight of tar =16.6%

*Second stage*

Total weight of solution of emulsifying agents=220 lbs.
Total weight of dry emulsifying agents=33 lbs.
Percentage by weight of emulsifying agents in solution=15%

The present invention enables aqueous emulsions of tar, bitumen or the like to be made in simple stirring apparatus, without it being necessary to employ a colloid mill, or a homogeniser. The emulsions so prepared are adequately stable in storage and break with sufficient rapidity when applied to a road surface.

What we claim is:

1. Process for the preparation of stable aqueous emulsions of a bituminous material such as road tars, pitch and bitumen suitable for use on roads, characterised in this, that an inverted emulsion is first prepared by mixing the bituminous material and a quantity of water amounting to about 12 to 16% by weight of the quantity of said bituminous material, together with a water-soluble emulsifying agent, and this inverted emulsion is then added to and dispersed in an aqueous solution containing about 15 to 25% by weight, dry basis, of water-soluble emulsifying agent, whereby the inverted emulsion is reverted into an emulsion of the "oil-in-water" type.

2. Process for the preparation of emulsions as claimed in claim 1, characterised in this, that simple stirring is employed for the preparation of both the inverted and reverted emulsions.

3. Process for the preparation of emulsions as claimed in claim 1, characterised in this, that the reverted emulsion is further diluted with water.

4. Process for the preparation of stable aqueous emulsions of a bituminous material such as road tars, pitch and bitumen suitable for use on roads, characterised in this, that an inverted emulsion is first prepared by stirring the whole of the bituminous material to be emulsified with a quantity of water amounting to about 12 to 16% by weight of the said bituminous material, together with at least a water-soluble alkaline compound as emulsifying agent, and said inverted emulsion is then gradually added while stirring to an aqueous alkaline solution containing a total of about 15 to 25% by weight, dry basis, of a water-soluble alkaline compound and an alkali-soluble protein as emulsifying agent, whereby the inverted emulsion is reverted into an emulsion of the "oil-in-water" type.

5. Process for the preparation of stable aqueous emulsions of a bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material together with an alkali soap, and said inverted emulsion is then gradually added to and dispersed in an aqueous alkaline solution containing a total of about 23 to 25% by weight, dry basis, of an alkali soap and an alkali-soluble protein, whereby said inverted emulsion is reverted into an emulsion of the "oil-in-water" type.

6. Process for the preparation of stable aqueous emulsions of a bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an alkali soap of liquid rosin, and said inverted emulsion is then gradually added to and dispersed in an aqueous alkaline solution containing a total of about 23 to 25% by weight, dry basis, of an alkali soap of liquid rosin and casein, whereby said inverted emulsion is reverted into an emulsion of the "oil-in-water" type.

7. Process for the preparation of stable aqueous emulsions of a bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an ammonium soap of liquid rosin, and said inverted emulsion is then gradually added to and dispersed in an aqueous alkaline solution containing a total of about 23 to 25% by weight, dry basis, of an ammonium soap of liquid rosin and casein, whereby said inverted emulsion is reverted into an emulsion of the "oil-in-water" type.

8. Process for the preparation of stable aqueous emulsions as claimed in claim 7, characterised in this, that the reverted emulsion is further diluted with water in the presence of an added alkali bichromate.

9. Process for the preparation of stable aqueous emulsions of bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an alkali soap and an alkali salt of a comparatively weak acid, and said inverted emulsion is then gradually added to and dispersed in an aqueous alkaline solution containing a total of about 15% by weight, dry basis, of an alkali soap, an alkali salt of a comparatively weak acid, and an alkali-soluble protein, whereby said inverted emulsion is reverted into an emulsion of the "oil-in-water" type.

10. Process for the preparation of stable aqueous emulsions of bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an alkali soap of liquid rosin and a tri-basic alkali phosphate, and said inverted emulsion is then gradually added to and dispersed in an aqueous alkaline solution containing a total of about 15% by weight, dry basis, of an alkali soap of liquid rosin, a tri-basic alkali phosphate and casein, whereby said inverted emulsion is reverted into an emulsion of the "oil-in-water" type.

11. Process for the preparation of stable aqueous emulsions of a bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an alkali salt of a comparatively weak acid, and said inverted emulsion is then gradually added to and dispersed in an aqueous alkaline solution containing a total of about 18% by weight, dry basis, of an alkali salt of a comparatively weak acid and an alkali-soluble protein, whereby said inverted emulsion is reverted into an emulsion of the "oil-in-water" type.

12. Process for the preparation of stable aqueous emulsions of a bituminous material such as road tars, pitch and bitumen suitable for use on roads, characterised in this, that an inverted emulsion is first prepared by mixing the whole of the bituminous material to be emulsified and a quantity of water amounting to about 12% by weight of the said bituminous material, together with an alkali alginate, and said inverted emulsion is then gradually added to and dispersed in an aqueous alkaline solution containing a total of about 18% by weight, dry basis, of an alkali alginate and casein, whereby said inverted emulsion is reverted into an emulsion of the "oil-in-water" type.

13. Process for the preparation of stable aqueous emulsions of a bituminous material such as road tars, pitch and bitumen suitable for use on roads, characterised in this, that an inverted emulsion is first prepared by mixing the whole of the bituminous material to be emulsified, and an aqueous alkaline solution containing a quantity of water amounting to about 16% by weight of the said bituminous material, together with an alkali soap and an alkali-soluble protein, and said inverted emulsion is then gradually added to and dispersed in an aqueous alkaline solution containing a total of about 15% by weight, dry basis, of an alkali soap, and an alkali-soluble protein, whereby said inverted emulsion is reverted into an emulsion of the "oil-in-water" tpye.

14. Process for the preparation of stable aqueous emulsions of a bituminous material such as road tars, pitch and bitumen suitable for use on roads, characterised in this, that an inverted emulsion is first prepared by mixing the whole of the bituminous material to be emulsified, and an aqueous alkaline solution containing a quantity of water amounting to about 16% by weight of the said bituminous material, together with an alkali soap of liquid rosin and casein, and said inverted emulsion is then gradually added to and dispersed in an aqueous alkaline solution containing a total of about 15% by weight, dry basis, of an alkali soap of liquid rosin and casein, whereby said inverted emulsion is reverted into an emulsion of the "oil-in-water" type.

WILLIAM JAMES CHADDER.
HENRY MICHAEL SPIERS.
EDWIN ARNOLD.